United States Patent [19]
Grossman

[11] Patent Number: 6,041,821
[45] Date of Patent: *Mar. 28, 2000

[54] FROZEN PIPE THAWING SYSTEM

[76] Inventor: Kurt L. Grossman, 8630 Twilight Tear La., Cincinnati, Ohio 45249

[ * ] Notice: Under 35 U.S.C. 154(b), the term of this patent shall be extended for 591 days.

[21] Appl. No.: 08/536,304

[22] Filed: Sep. 26, 1995

Related U.S. Application Data

[62] Division of application No. 08/192,171, Feb. 4, 1994.

[51] Int. Cl.⁷ ...................................................... E03B 7/14
[52] U.S. Cl. ................................ 138/33; 138/35; 219/29; 134/5; 134/22.1
[58] Field of Search ................................. 138/33, 32, 35; 219/201, 229, 236; 134/166 C, 5, 22.11

[56] References Cited

U.S. PATENT DOCUMENTS

| | | | |
|---|---|---|---|
| 501,744 | 7/1893 | Streeper | 138/35 |
| 558,992 | 4/1896 | Silver | 138/35 |
| 3,275,803 | 9/1966 | True . | |
| 3,764,779 | 10/1973 | Kadoya et al. | 138/33 |
| 3,767,117 | 10/1973 | Baker . | |
| 4,102,358 | 7/1978 | Sherock . | |
| 4,110,597 | 8/1978 | Elmore | 138/33 |
| 4,124,039 | 11/1978 | St. Laurent . | |
| 4,194,536 | 3/1980 | Stine et al. | 138/33 |
| 4,250,925 | 2/1981 | Mast | 138/35 |
| 4,314,140 | 2/1982 | Hughes . | |
| 4,423,311 | 12/1983 | Varney, Sr. | 138/33 |
| 4,449,553 | 5/1984 | Sullivan et al. . | |
| 4,575,614 | 3/1986 | Hughes . | |
| 4,883,943 | 11/1989 | Davis . | |
| 4,986,311 | 1/1991 | Mikkelson | 138/32 |
| 5,193,587 | 3/1993 | Miller, Jr. . | |
| 5,214,266 | 5/1993 | Halone, Jr. | 138/33 |
| 5,289,561 | 2/1994 | Costa Filho . | |

FOREIGN PATENT DOCUMENTS 1178198  5/1959  France .

*Primary Examiner*—James F. Hook

[57] ABSTRACT

A micro heater assembly (10) is provided with a micro heater (12) on the distal end (14) of an elongated support wire (16). Micro heater (12) is insertable into a frozen pipe (60) to reach the frozen area (100) of the pipe (60) whereat to thaw pipe (60) from within safely and cost-effectively.

4 Claims, 1 Drawing Sheet

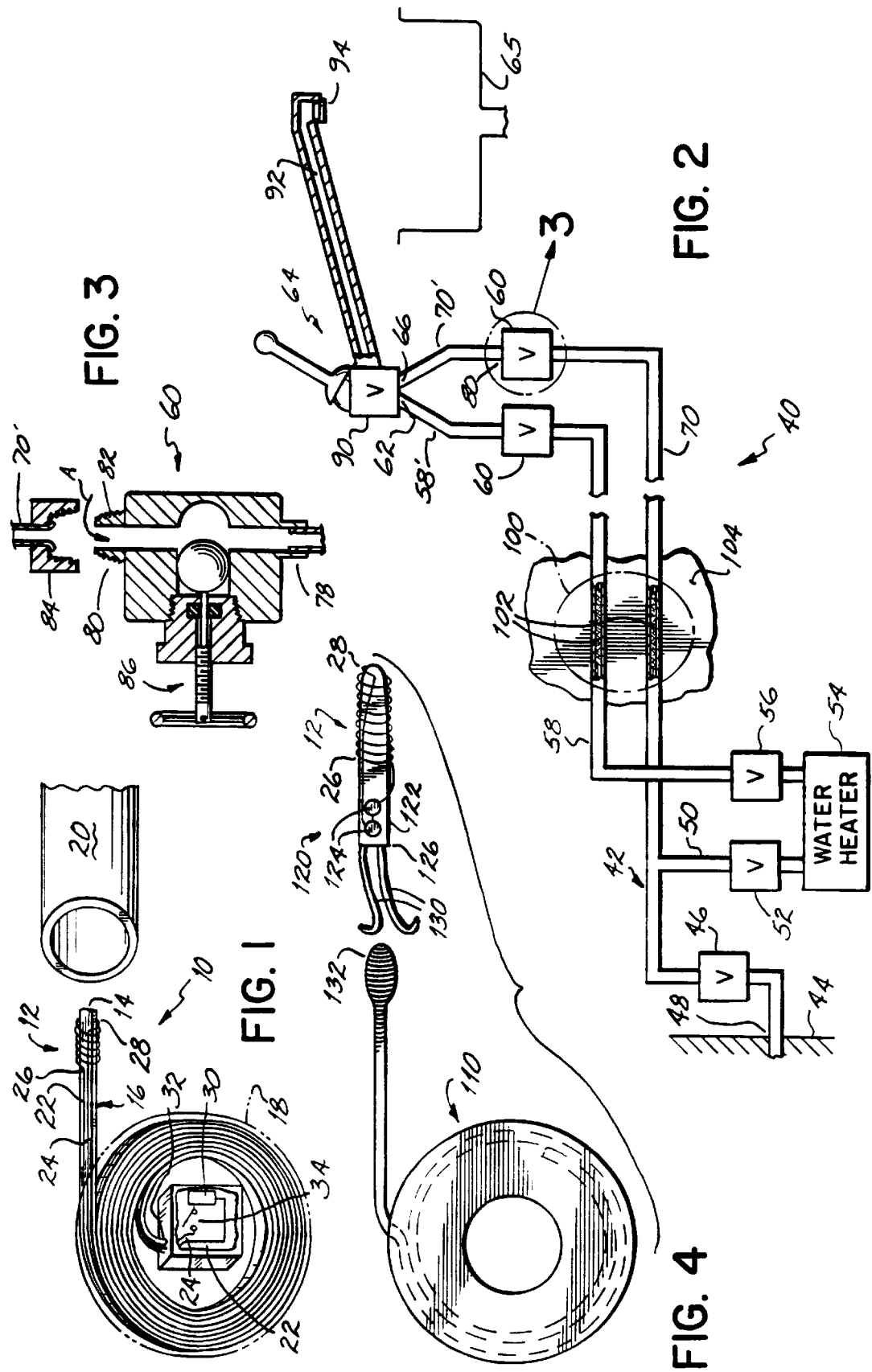

FROZEN PIPE THAWING SYSTEM

RELATED APPLICATION

This application is a divisional of my application Ser. No. 08/192,171 filed Feb. 4, 1994 and entitled Frozen Pipe Thawing System.

BACKGROUND OF THE INVENTION

I. Field of the Invention

The present invention relates to a system and method for thawing frozen pipes in a safe and cost-effective manner.

II. Description of Prior Art

In many areas throughout the United States and other countries, the temperature in the wintertime, for example, gets so cold that water pipes that are near exterior walls tend to freeze up. Frozen pipes are not only an inconvenience, but if not attended to, could rupture leading to expensive and sometimes dangerous situations.

Usually, when a pipe freezes, the homeowner has only a few options, none of which are particularly desirable. The homeowner could just "wait it out" and hope the pipe does not burst while waiting for the weather to warm up enough to thaw the pipe. This wait and see approach could be risky leaving the pipe vulnerable to rupture, not to mention the inconvenience of going without running water from that pipe for a possibly prolonged period of time. Another common approach is to attempt to thaw the pipe by applying heat to the pipe such as with a hair dryer or a torch. In these cases, either insufficient heat may be applied or the danger of fire is greatly increased. A third alternative is to cut into the ceiling or wall of the house to expose the frozen segment of the pipe to room air or to apply heat directly to the frozen section. Not only is this expensive and destructive, it leaves the homeowner exposed to the same risks of fire when heat is used.

SUMMARY OF THE INVENTION

The present invention provides a system and method for safely and cost-effectively thawing frozen pipes that does not expose the home to increased risk of fire or the need to be torn apart. Nor is it necessary to simply wait and see what will happen. To this end, and in accordance with the principles of the present invention, a micro heater is provided on an elongated support that can be inserted into the pipe remote from the frozen section and snaked down the pipe to the site of the blockage whereat the micro heater melts the frozen section from within. In this way, there is no risk of fire or dangerous overheating to the surrounding structure of the house, nor is there any need to wait, and risk rupture of the pipe. Once the pipe is unfrozen, the micro heater is simply removed and the faucet turned on and allowed to run to keep the water flowing so the pipe does not refreeze.

In accordance with one aspect of the present invention, the micro heater may be installed directly through a faucet coupled to the frozen pipe. Alternatively, the pipe may be opened at a readily accessible location, such as at a turn-off valve, and the micro heater inserted there. After unfreezing the pipe, the pipe is reclosed and the water system restored.

By virtue of the foregoing, there is thus provided a system and method for safely and cost-effectively thawing frozen pipes without exposing the dwelling or residents thereof to unnecessary risk or expense. These and other objects and advantages of the present invention shall be made apparent from the accompanying drawings and description thereof.

BRIEF DESCRIPTION OF THE DRAWING

The accompanying drawings, which are incorporated in and constitute a part of this specification, illustrate embodiments of the invention and, together with a general description of the invention given above, and the detailed description given below, serve to explain the principles of the invention.

FIG. 1 is a perspective view of a micro heater assembly in accordance with the principles of the present invention;

FIG. 2 is a schematic view of a plumbing system with a frozen section for explaining use of the micro heater of FIG. 1 in accordance with the principles of the present invention;

FIG. 3 is an exploded, schematic cross-sectional view of the encircled portion of plumbing system of FIG. 2; and FIG. 4 is a disassembled elevational view of a self-contained micro heater assembly.

DETAILED DESCRIPTION OF THE DRAWINGS

With reference to FIG. 1 there is shown a micro heater assembly 10 having a micro heater 12 mounted to the distal end 14 of support 16. Support 16 may be an elongated electrician's wire puller, or other, preferably flexible but relatively stiff, support such as a coaxial cable or telephone cable. Support 16 is flexible enough to traverse bends and turns, but stiff enough not to just crumple up at a bend or turn. Support 16 may be coilably held on a roll or spool 18 and payed out as needed to snake micro heater 12 down through a pipe as will be described. Heater 12 and support 16 are sized small enough to fit easily within the interior of a typical water pipe such as pipe 20 representative of the ¼", ½" or other copper pipes typically in use in homes today. Thus, heater 12 and wire 16 may be less than ¼", or preferably less than ⅛" wide or thick.

Micro heater 12 may be any small size heater such as an inch or so length of resistance or nichrome wire (such as from a portable hair dryer) wrapped around distal end 14 of support 16 and fastened thereto in any acceptable manner. Alternatively, heater 12 may be a ceramic or other electrically energizable heating element. If necessary, an insulative layer or web (not shown) may be provided between heater 12 and support 16 and also over heater 12 so it does not short out within the pipe. Upon application of electrical power to resistance wire heater 12, it will heat up. Sufficient length or number of turns of resistance wire and sufficient energy should be provided to cause heater 12 to heat up enough to melt a frozen section of pipe. To this end, insulated conductors or wires 22, 24 are electrically coupled to opposite ends 26, 28, respectively, of heater wire 12. Wires 22, 24 extend along support 16 to a source of power 30 at the proximal end 32 of support 16. Power source 30 could be one or more batteries or a transformer plugged into a conventional AC wall outlet (not shown). Wires 22, 24 could, alternatively, be heater wire as well for some of their length to facilitate thawing. An on/off switch 34 is provided in series with one or both of wires 22, 24 to turn heater 12 on or off as desired. Where support 16 is a coaxial cable or multi-wire cable, such as a telephone cable, the conductors within the cable may provide wires 22, 24.

In a conventional plumbing system 40, such as shown schematically in FIG. 2, a main water line pipe 42 enters into the building such as through a basement wall 44 thereof. There is usually a main shut-off valve 46 near the entry point 48 of pipe 42. Pipe 42 supplies water for both hot and cold runs. To this end, a pipe 50 connected to pipe 42 couples cold water via turn-off valve 52 to hot water heater 54 which in turn couples cold water (via turn-off valve 56) to pipe 58. Pipe 58 connects through a first sink turn-off valve 60 to the hot water tap 62 of an outlet point such as a faucet 64, such as at a kitchen or bathroom sink 65, or a bath or shower. Cold water is coupled directly from water line pipe 42 to pipe 70. Pipe 70 couples cold water via a second sink turn-off valve 60 to the cold water tap 66 of faucet 64. Cold water may also be coupled via other pipes (not shown) to bathroom toilets and to outdoor faucets. Usually, there is a sink turn-off valve, such as a valve 60, near each such outlet point.

As seen in FIG. 3, the feed or inlet side 78 of valve 60 is usually soldered to the hot or cold water supply pipe such as pipe 70 for generally permanent attachment. On the other hand, the outlet side 80 of valve 60 is usually removably sealed to the length of pipe 58' or 70' between valve 60 and faucet taps 62, 66 such as by cooperation of a threaded nipple 82 on the valve 60 and nut 84 about the pipe. Often, valve stem 86 of valve 60 is removable. Water flow through pipes 58' and 70' is controlled by valve 90 of faucet 64 to selectively couple water through the aperture 92 running through faucet 64. Water exits through aperture 92 within faucet 64 and through a strainer or screen 94 at which aperture 92 terminates. As will be appreciated, strainer 94 is normally threaded into the end of faucet 64.

When any portion of one of the pipes, such as portion 100 of a pipe such as pipe 70, becomes too cold, it may freeze creating an ice block or frozen zone 102 within the pipe. Usually, this freezing occurs where the pipe is close to or adjacent to an exterior surface, such as a wall 104 of the dwelling which is not warmed by the interior of the house sufficiently to avoid freezing. These locations usually are buried within a wall or ceiling of a house and are, therefore, not easily accessible. Also, they are usually sufficiently remote from any easily accessible portion of pipe, such as at shut-off valve 46 or a turn-off valve 60, that heating those accessible portions of the pipe will not always unblock zone 102. Also, application of heat could be disastrous due to the risk of fire and the like.

The present invention solves the frozen pipe problem safely and cost-effectively with micro heater assembly 10 as will now be described. To unblock freeze 102, micro heater 12 is to be placed into a pipe 70 at a location which may be remote from freeze 102 such as at turn-off valve 60. To this end, and preferably after main shut-off valve 46 is closed (so water does not spew out once the pipe is unblocked) nut 84 may be easily unthreaded from nipple 82 of valve 60 to release pipe length 70' therefrom and expose outlet side 80 of valve 60 (see FIG. 3). With valve 60 (and valve stem 86) in the full open position, micro heater 12 is inserted into the outlet side 80 of valve 60 along the direction of arrow A in FIG. 3. Alternatively, with pipe 70' held in place, valve stem 86 may be removed and heater 12 inserted through the opening. In either case, with pressure applied by pushing on support 16 at a location rearwardly of heater 12, micro heater 12 is moved into and through valve 60 and into pipe 70 towards area 100. Heater 12 is moved until it runs up against frozen portion 102. Micro heater 12 is preferably energized (such as by turning on switch 34 at supply 30 before or while it is being inserted into valve 60) so that as it approaches section 100, any water in pipe 70 along the way is being warmed to help open up the pipe as heater 12 travels. Heater 12 is held near or within location 100 until pipe 70 is thawed to release ice from zone 100. Thereafter, micro heater 12 may be removed. To test if the pipe is thawed, micro heater 12 can be attempted to be inserted further down pipe 70 towards pipe 42. If heater 12 can be pushed a further distance, then blockage 102 may be assumed to be thawed. Preferably, micro heater 12 is kept in place for an extra period of time long enough to heat area 100 so that it will not refreeze during removal of micro heater 12 and restoring of the water system.

After thawing frozen portion 100, heater 12 is withdrawn from pipe 70 and valve 60. Pipe 70' is then reconnected to valve 60 by threading nut 84 back onto nipple 82 (or valve stem 86 replaced). Main valve 46 is then reopened and valve 90 of faucet 64 opened to allow water to run therethrough. Usually, maintaining a flow of water will prevent refreezing during the cold spell so that pipe 70 will remain unblocked merely by leaving faucet 64 partially open until the weather warms up.

In some faucets, aperture 92 may be sufficiently large that heater 12 may be snaked therethrough. In this event, strainer 94 is unthreaded from the end of the faucet and heater 12 inserted into aperture 92. Valve 90 of faucet 64 is to be open so that heater 12 can pass therethrough as described with valve 60 (which should also be full open to permit heater 12 to pass through valve 60 as well). Heater 12 is then snaked to the blockage as before described. In this approach, pipe 70' need not be removed from valve 60. Also, because the faucet and valves are all in place relative the sink 65, it may not be necessary to first close main shut-off valve 46 when unblocking pipe 70 through the faucet. Rather, valve 46 may be kept open so that once pipe 70 is thawed, water can freely flow from faucet 64 into the sink (although it will probably splash). Once heater 12 is removed, the water may be turned down (or off momentarily) at faucet valve 90 so that strainer 94 may be threadably reattached to the faucet.

In use, when it is necessary to thaw a frozen pipe, access into the frozen pipe is made at a location remote from the frozen area such as via a turn-off valve or faucet as above described with the micro heater 12. Heater 12 is then snaked toward and into the site of the blockage and the area heated by the action of heater 12 until the frozen pipe is thawed. Heater 12 is then withdrawn and the plumbing system restored so that there is now running water available.

In some cases, it may be desirable to use a conventional plumber's snake 110 (FIG. 4) for moving heater 12 to the frozen zone 102. For this purpose, a self-contained micro heater assembly or cartridge 120 may be provided. Heater 120 includes micro heater 12 as before described mounted to a small support member 122. Also carried by support 122 are one or more batteries 124 (such as small watch batteries so they may fit within pipe 20). Batteries 124 are mounted with micro heater 12 and electrically connected to the ends 26, 28 of the heater wire 12 in any usual manner. A switch function may be provided by a selective connection of one end 26 or 28 of heater 12 to the batteries 124. Support 122 includes at its proximal end 126 a tie-band 130 which may be releasably secured to the distal end 132 of snake 110 by twisting band 130 into distal end 132. Other securing mechanisms or approaches may also be utilized as will be readily appreciated.

Use of micro heater cartridge assembly 120 is generally like that of assembly 12.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. For example, heater 12 could be a chemically initiated heater element which eliminates the need for electrical power. In that event, the heater may be a flexible container with two compartments separated by a rupturable membrane with each compartment carrying a respective chemical. When ready for use, the container is flexed to rupture the membrane so the two chemicals can react to create the desired heat. Although such a device might be limited to a one-time use, it may serve as a micro heater cartridge like FIG. 4, for example, but which is disposable. Also, an easily accessible portion of a pipe remote from zone 102 to either side of the zone may be removed such as by cutting or with a torch and heater 12 snaked into the pipe and toward the frozen zone 102 as above-described. After thawing, the cut location will have to be restored such as with a connector soldered in place. Still further, it may be that not only is cold water pipe 70 frozen within area 100, but a portion of hot water pipe 58 adjacent pipe 70 in area 100 may also be frozen thereat. By placing heater 12 at the zone 102 of pipe 70, it may also be possible to generate enough heat to warm the adjacent portion of pipe 58 to then thaw pipe 58 as well without separately inserting a heater 12 into pipe 58. It will be understood, in view of the foregoing, that the term "micro heater" is meant to refer to any self-defined device or structure having a heat generating portion small enough to fit within a pipe to be thawed. The invention in its broadest aspects is therefore not limited to the specific details, representative apparatus and method, and illustrative examples shown and described. Accordingly, departures may be made from such details without departing from the spirit or scope of the general inventive concept.

Having described the invention, what is claimed is:

1. A method of thawing a frozen pipe in a home plumbing system wherein the pipe is coupled to a faucet having an aperture therein, the method comprising:

first opening the aperture to atmosphere, the aperture being in communication with the frozen pipe;

inserting a micro heater into the pipe through the aperture and moving the micro heater towards a frozen location of the pipe;

thawing the frozen location from within the pipe by action of the micro heater.

2. The method of claim 1 wherein the faucet aperture terminates in a strainer, the method further comprising removing the strainer before inserting the micro heater.

3. The method of claim 1 wherein the pipe is coupled to a water line inlet through a shut-off valve, the method further comprising having the shut-off valve in an open state.

4. A method of thawing a frozen pipe section of a first pipe situated adjacent to a second pipe comprising:

inserting into the second pipe a micro heater sized to fit within the second pipe;

moving the micro heater within the second pipe to a portion of the pipe adjacent to the frozen pipe section of the first pipe; and thawing the frozen section of the first pipe from within the second pipe by action of the micro heater.

* * * * *